Sept. 30, 1969  H. T. LANDOW  3,470,370
VEHICLE ROUTE TRACER
Filed Feb. 13, 1967  2 Sheets-Sheet 1
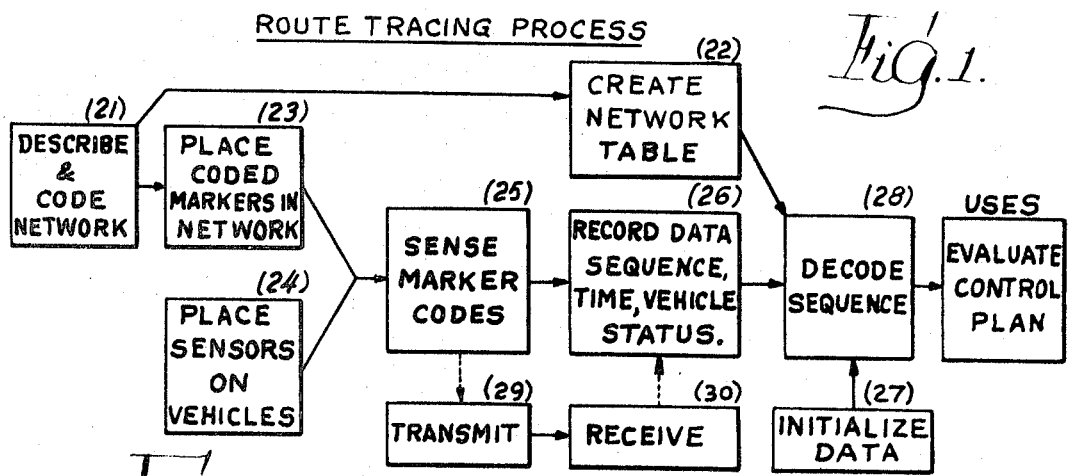
Fig.1. ROUTE TRACING PROCESS
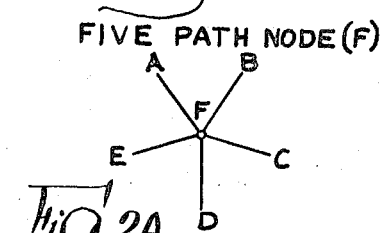
Fig.2. FIVE PATH NODE (F)
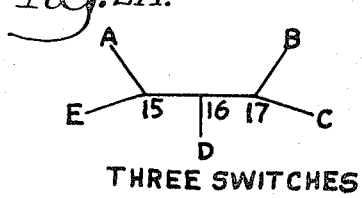
Fig.2A. THREE SWITCHES
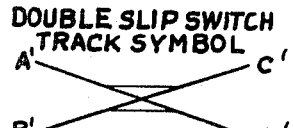
Fig.3. DOUBLE SLIP SWITCH TRACK SYMBOL
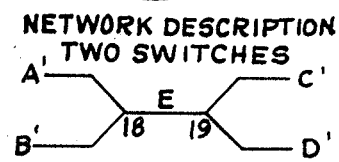
Fig.3B. NETWORK DESCRIPTION TWO SWITCHES
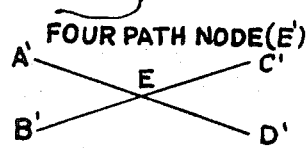
Fig.3A. FOUR PATH NODE (E')
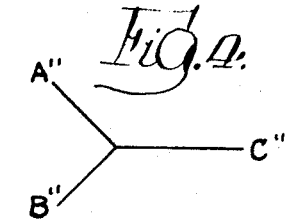
Fig.4.
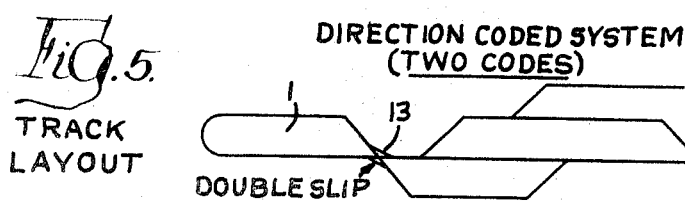
Fig.5. TRACK LAYOUT
DIRECTION CODED SYSTEM (TWO CODES)
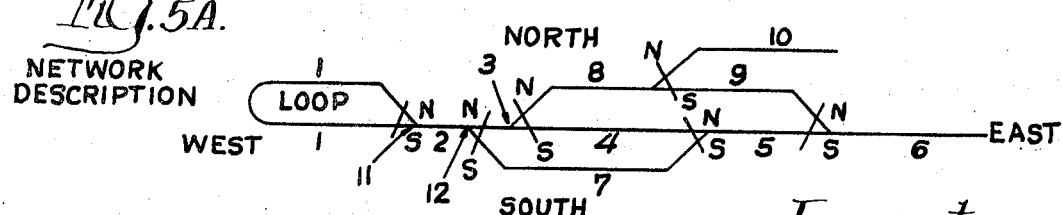
Fig.5A. NETWORK DESCRIPTION
*Inventor:—*
*Herbert T. Landow,*
*By Sabin C. Bronson*
*Atty.*

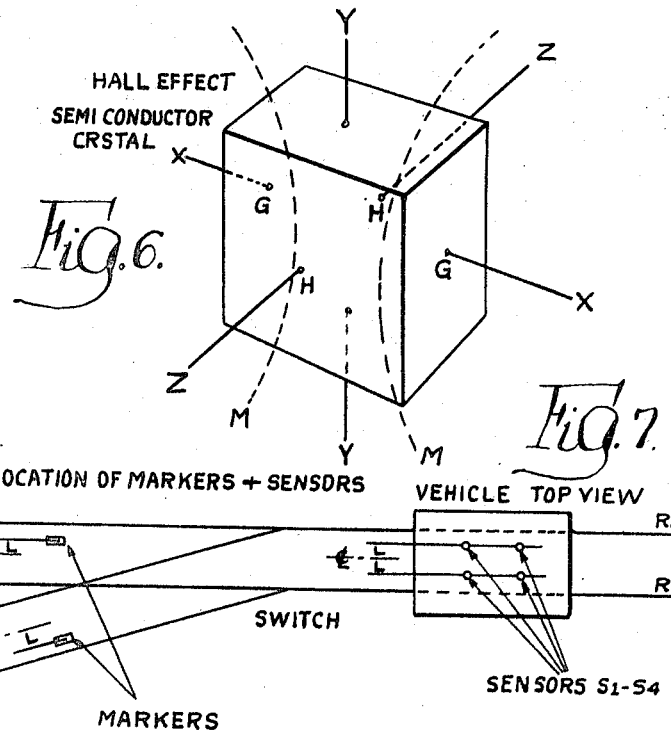
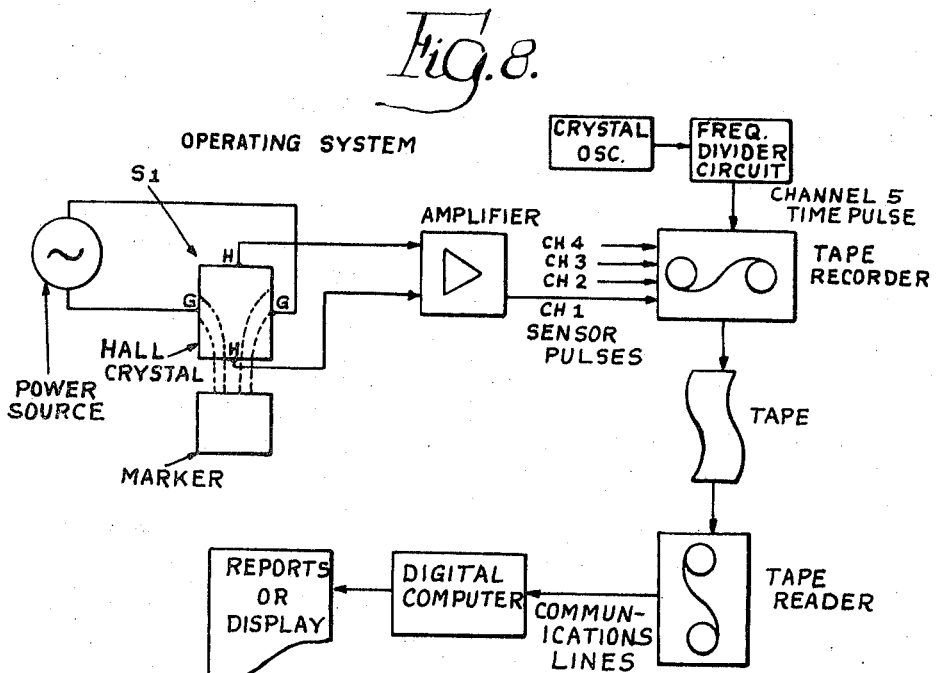

United States Patent Office 3,470,370
Patented Sept. 30, 1969

3,470,370
VEHICLE ROUTE TRACER
Herbert T. Landow, 11212 W. 74th St.,
La Grange, Ill. 60525
Filed Feb. 13, 1967, Ser. No. 615,587
Int. Cl. B61l 25/00, 27/00; B61b 1/00
U.S. Cl. 246—122                             8 Claims

ABSTRACT OF THE DISCLOSURE

The vehicle moves on paths interconnected into a network. Two paths converge to form a third path at a network node. At each node, each of the converging paths is equipped with a coded marker. Two codes are used, one for each converging path. Vehicles are equipped to sense the markers and record or transmit the code. The position and/or route of the vehicle is inferred by relating the code sequence to the network description and a statement of initial vehicle position in the network.

BACKGROUND OF THE INVENTION

Field of the invention

The objective of the process described here is to determine the position occupied or route taken by vehicles in a network of paths by encoding the network with a radically reduced number of codes. The availability of this data will promote efficiency, performance planning and control of both vehicles and their crews.

The industries to which this process applies are numerous. In particular, railroading is an industry which is very likely to have significant uses for the route tracing process. Consequently, the examples used in this specification will be drawn from that industry. The specific railroad context most illustrative of the application of the invention is the track network in an industrial switching territory. The scope and spirit of the invention, however, extend to any paths or networks on which vehicles move.

Description of prior art

Most contemporary systems for gathering movement data use a direct measurement technique. When the vehicle passes a specified point or occupies a particular track, sensing devices report the event as a direct observation of vehicle position. By direct observation we mean that the position and identity of the marker passed or track occupied is immediately known by the activation of devices related thereto without relation to prior or subsequent events.

Another practice commonly used to determine vehicle movement is to manually record the data, using the crews or specially assigned riders. Crew reluctance to record data heightens the need for special personnel and these additional personnel are so expensive as to be used only on a special study basis.

SUMMARY OF THE INVENTION

To secure a low cost process we are outlining here a process whereby direct observation and manual recording are abandoned in favor of sensing signals whose *sequence* is indicative of vehicle position and sequence of positions (route). This system gathers data by equipping vehicles with sensors which detect the presence of coded network markers. The signals are recorded and the code sequence is processed to determine the route which must have been taken to generate that code sequence.

The economic advantage of the invention is derived from the low number of codes which radically simplifies equipment design. The simplified code structure is possible because of the description of a complex route network into its smallest and simplest components in accordance with the rules and definitions provided in this specification. The network description shows for each route segment the adjacent route segments and the code at the juncture of the segments. The marker codes identify the alternative path taken by the vehicle at a network node. Markers are physically established in the network and encoded to correspond to the description.

BRIEF DESCRIPTION OF THE DRAWING

FIG. 1 is an illustration of the route tracing process expressed in flow chart form.

FIGS. 2 and 2A diagrammatically illustrate the logical equivalency between a node which has five paths and a series of switches (nodes) each of which has three paths.

FIGS. 3, 3A and 3B diagrammatically illustrate the logical equivalency between a double slip switch and a four-path node and two switches of three paths in series.

FIG. 4 is a diagrammatic illustration of a notation used for a three-path node.

FIGS. 5 and 5A diagrammatically illustrate the equivalency between a physical track network and its description in accordance with the use of the convergence rule, node-switch equivalency and direction coding.

FIG. 6 is a three dimensional diagrammatic sketch of the Hall effect.

FIG. 7 is a diagrammatic illustration of the location of markers and sensors when lateral alignment coding and direction sensing by longitudinal alignment of the two sensors is employed.

FIG. 8 is a diagrammatic illustration of an operating system whose markers and sensors are located as described in FIG. 7.

DESCRIPTION OF PREFERRED EMBODIMENTS

The preferred embodiment of the invention will employ the use of a three-path switch description for all nodes, the convergence rule, direction coding and segments with no more than two nodes. This will enable the use of a two-code system to encode the entire network. Hall crystal (indium antimonide) sensors and static magnetic field markers are preferred for code sensing. Direction sensing by use of sensors in longitudinal alignment is also preferred.

These preferences will be more fully explained in the specification to follow. These specifications are organized under the major headings of General Description, Definitions, Coding, Route Tracing, and Data Sensing Technology.

GENERAL DESCRIPTION

Vehicle motion is traced by indicating the vehicle starting point and analyzing the network description together with the marker code sequence sensed during the trip.

The route tracing process is diagrammatically illustrated in FIG. 1. Each of the blocks in that diagram is discussed below.

Block 21—The network is analyzed into coded route segments using the rules and definitions provided, and markers are assigned code values.

Block 22—A network table is created showing, for each route segment, the adjacent segments and the marker codes used between the segments.

Block 23—Markers are placed in the physical network in correspondence with the requirements of the network analysis.

Block 24—The vehicle is equipped with sensors to sense the markers and record or transmit the code to recording devices.

Block 25—The vehicle senses the codes during its movement over the network.

Block 26—A record of the sensed codes is established.

Block 27—The data series is initialized.

Block 28—Inferences are made as to the motions of the vehicle which must have occurred to generate the sensed data sequence.

Block 29—If real time usage of the data is desired, a radio transmitter on the vehicle can send coded signals to a fixed location.

Block 30—At the fixed location the transmitted code signal can be received prior to its being recorded.

There are some benefits of having management aware of vehicle location and performance on a real time basis. It is then possible to modify operations so that opportunities can be seized at the moment that they exist.

Real time systems for the route tracer would require the prompt radio transmission of data to a fixed location for receipt, recording, interpretation and display. Data could also be used in the manner discussed above for non-real time systems. Boxes 29 and 30 of FIG. 1 show this radio transmission option in the total system, being used in lieu of recording on the vehicle.

DEFINITIONS

Vehicle route tracing requires the description of the physical network. In creating that description certain rules and definitions are required and provided below:

Paths

The system assumes that the vehicle whose position is to be determined moves only forward or backward along predefined pathways or tracks. Lateral movement of these pathways may be physically possible, but such movement will violate the logic requirements of the system. The *path* is an abstraction representing a two-dimensional line of movement.

Nodes

The paths are interconnected into a network at points referred to as *nodes*. Three or more paths may meet at a single node. Paths, as possible lines of movement, exist in two forms, i.e., (1) Between two nodes.
(2) From a node to a point signifying the physical end of the track or pathway.

Switches

We will restrict the term *switch* to nodes which receive three and only three paths. This largely corresponds to the common use of the term in the physical network to describe the place at which three tracks meet. The division of a path into two line segments is possible existentially and logically—but the juncture of these line segments is not the juncture of paths at a switch.

Further, the conjoining of more than three paths at one location in the physical world does not violate our definition of a switch. Rather, it means that the physical layout may be described in terms of its logical equivalent, several switches in sequence.

Node-switch equivalency

The paths to a node are always two in excess of the number of switches in the descriptive series. A three-path node is equivalent to *one* switch. A five-path (A, B, C, D, E) node (F) can be described in terms of three switches in series. See FIGS. 2, 2A.

In these situations the node itself is regarded as an identifiable place (F) on which the vehicle can reside while moving to and from paths which lead to the node. In the three-switch sequence 15, 16 and 17 (FIG. 2A), the node includes the place between the nodes of the first 15 and third 17 switches and is split by the second switch 16 into several parts.

Other physical conjoinings of tracks at which more than three paths meet can be described as a series of three-path nodes (switches). An example of a four-path (A', B', C', D') node (E') in the physical track network is a double slip switch. It is equivalent to two three-path switches 18 and 19. See FIGS. 3, 3A, 3B. Similarly, a single slip switch is identical to a double slip switch with the added rule that one of its route combinations is not valid or possible. Other physical track conjoinings are subject to a similar descriptive reduction to a series of three-path nodes (switches).

Convergence

Convergence occurs where three paths meeting a switch (A", B" and C") allow continuous motion from two of the paths (A", B") to the third path C", but not from path A" to path B". See FIG. 4. Continuous motion is defined for this purpose as motion not requiring a reversal of direction.

When the convergence rule applies, motion from A" to B" (the converging paths) requires passage from A" to C", followed by reversal of direction and movement from C" to B". Moves A"C", C"A", B"C", C"B" are continuous movements. Moves A"B" or B"A" are not continuous moves.

This set of rules results in defining two paths as converging (A", B") with respect to C", or conversely, path C" *diverging* to form paths A" and B". The A" and B" paths are referred to as the *legs* of the switch.

Not all network nodes require the use of the convergence rule. To the extent, however, that convergence does, in fact, occur, the rule must be used in creating the network description.

Vertical movement

The path network may have a vertical dimension. Changes in elevation, however, do not occur within the nodes themselves. Consequently, from the standpoint of route tracing, any two nodes connected by a single path can be treated as if they were on a two-dimensional surface, i.e., their vertical characteristics can be ignored.

Routes

A *route* is a sequence of positions or paths occupied, involving reversal of direction if necessary.

Route segments

A path ends at the location of a node. The route segment is defined in a slightly different way, i.e., (1) The path or paths between two route segment markers.
(2) The path from the point signifying the physical end of a pathway or track to a route segment marker.

Route segment marker

Each path element may lead (through nodes) to other path elements. Consequently, as many unique codes must be generated in the system as are needed to unambiguously identify the new path element into which the vehicle has passed. Contributing toward this end in the physical network is a code generating or responding device, called a *marker*. These markers define the limit of adjacent route segments and identify each exit from a route segment to an adjacent segment.

CODING

This invention is based upon the dispersion of code markers in the physical track network so as to enable vehicle borne sensing devices (described below) to gather a sequential record of code signals from which vehicle position or position sequence (route) may be determined. The definitions provided above state the rules by which the network can be described and segmented by the marker components. The following paragraphs will discuss coding requirements and technique.

For the code signal sequence to be valid, it must be the case that all nodes be coded which provide access to adjacent route segments. Without such coverage ambiguity would arise as to vehicle position. A route segment, however, may include a path or paths from which there is no exit to other route segments. The nodes of such paths need not be coded unless the consequent data is of interest to the user.

Further reference to nodes will be to those nodes needed to avoid position ambiguity or desired by the user to provide supplementary detail concerning vehicle position.

Markers vs. codes

The rules and definitions provided make it possible for the codes to be fewer in number than the markers. The codes are, in fact, repeatedly used in the network. The codes are unique to a route segment, but not unique to the network as a whole. The low cost character of the invention is largely attained by the use of a small number of codes. Although the number of codes used may be more numerous than the minimal requirement, this practice is economically wasteful and contrary to the economic objectives of the invention although technically encompassed by the invention if inference is employed in lieu of direct measurement or observation processes.

By inference we mean knowledge of position acquired on the basis of knowledge of prior position, together with subsequent sensing of a route segment marker and its code. Taken together with the network description it is then, and only then, possible to determine the position of the vehicle in the network.

Minimum code requirements

In the specifications to follow, we will discuss the invented route tracing process in terms of three-path nodes and the convergence rule. These specifications correspond to most of the physical networks in existence and make the most meaningful description of the invention. This is not intended, however, to limit the scope of the invention which nevertheless pertains to route tracing by means of inferential analysis of signal sequence in which the prior occupied route segment must be stated or inferred before the present occupied route segment can be known.

The minimum number of codes needed without direction coding will be found in the situation wherein a route segment contains only one three-path node. (Only nodes required for non-ambiguity or detail are discussed here.) In this one node per segment condition, the minimum number of codes required is equal to the maximum number of adjacent route segments (three).

The three-code minimum assumes that a maximum of one node exists per route segment. When two nodes exist per segment, the minimum number of codes is increased to four, one for each exit from the segment. Each node contains two diverging routes from the segment. Code requirements can then be further reduced to two codes by the direction coding technique discussed below.

Direction coding

Each route segment, like the paths of which it is composed, admits of vehicle motion in only a forward or backward direction. Because the exits from a route are either in front of or behind the vehicle, it is possible to reduce the coding requirements still further. A route segment in any one direction from the vehicle has no more than one node and two exits.

If data is gathered on the vehicle direction at the time of sensing the markers, then the node passed is effectively identified and it is possible to reduce the unique codes used in the system to two, one for each diverging switch leg at the node passed. We will refer to this technique as *direction coding*.

Direction coding permits markers to be of only two-code varieties, but it is necessary to sense the orientation of the vehicle in the network. Data must be provided on the meaning of the terms *forward* or *backward* with reference to the network. We refer to this data as *orientation*.

Further, the existence of loop tracks will allow the vehicle to reverse its orientation. A Y track is a variety of loop track, whose use involves two reversals of direction to achieve one reversal of vehicle orientation. Such reversal must be observed and considered in the analysis of the gathered data sequence.

A loop or Y track is a two-exit route segment. If the vehicle enters the loop past one code marker and leaves via the other code marker (exit), the vehicle must be regarded as having reversed orientation for subsequent movements. Orientation and direction data gathering will be further discussed below.

ROUTE TRACING

The movement of the vehicle is inferred from three types of data. These are:
 (A) The route network description.
 (B) Initialization data.
 (C) Sequentially gathered and recorded marker code data.

The route network

The network is an abstracted version of the physical network created in accordance with the rules specified above. If the physical network is organized in such a way that we may describe the essential movement possibilities with those rules, then that physical network is a potential application of this system.

When the network is only partially described, the system of inference is broken at the point of non-description. A return of the vehicle to described paths allows the system of inference to function once again. A railroad turntable or transfer table is an example of a network node commonly approached by more than three paths and lacking a convergence rule. A user can delete such nodes from the description if he is willing to break the pattern of inference and re-initialize when the vehicle returns to a network whose nodes are marked and coded. This will permit the process to employ a low number of codes despite the rare presence of complex nodes.

Initialization

This is the statement of the location and, if direction coding is used, the orientation of the vehicle. Orientation is the direction faced by the vehicle with respect to the described network.

Initialization data may correspond to specified signals at the beginning, end or intermediate positions in the signal sequence to be analyzed.

Data gathering

Data is gathered by sensing devices located on the vehicle. Stationary sensing devices which detect the occupancy of each route segment directly by track circuitry or other "OS" reporting devices do not determine location by inference and are not encompassed by this system.

Example

The following paragraphs exemplify the process through which route tracing is achieved:

To provide an illustration of the process there is symbolized in FIG. 5 a track layout and its corresponding network description as in FIG. 5A made with the use of a three-path node-switch reduction and a convergence rule. The network includes a loop track segment 1 because direction coding is to be illustrated. Two code, direction oriented coding is used. The two codes are symbolized by the letters N, S.

A double slip switch 13 will be observed in the track layout, FIG. 5. The double slip switch has been reduced to two switches 11 and 12 on route segment number 2 FIG. 5A. This segment is the node of the double slip switch.

The terms North, East, South, West, right, left, forward or backward are descriptive of an interpretation that may be made as to vehicle movement. Actual data gathering may take several forms and the data gathered may be stored initially in a form reflecting the nature of the technology used rather than the final interpretation. The technology will be described in a later section.

Table 1 describes for each route segment, the adjacent segments and the codes between them. It will be referred to as the *network table*.

TABLE 1.—NETWORK TABLE

| Route segment: | Exit | | | |
|---|---|---|---|---|
| | N | | S | |
| | NW | NE | SW | SE |
| 1 | Rev. 2 | 2 | Rev. 2 | 2 |
| 2 | 1 | 3 | 1 | 7 |
| 3 | 2 | 8 | NV | 4 |
| 4 | NV | 5 | 3 | NV |
| 5 | 4 | NV | 7 | 6 |
| 6 | 9 | NV | 5 | NV |
| 7 | NV | NV | 2 | 5 |
| 8 | 3 | 10 | NV | 9 |
| 9 | NV | 6 | 8 | NV |
| 10 | 8 | NV | NV | NV |

NV = Not Valid Route.

There are two columns under each code heading, N, S. These are NW, NE and SW, SE. The direction coding used requires orientation data. Vehicle direction is sensed at the time of marker sensing. The N/S codes sensed may be associated, therefore, with the forward/backward direction of the vehicle. In the initialization statement the orientation is declared, e.g., forward (F) = East (E); backward (B) = West (W). A North Forward code (N/F) is then regarded as NE and the NE column of data in the network table is the operative column.

The term reverse (Rev.) in the body of the table signifies that the code in question requires a reversal of the orientation statement for subsequent moves.

Decoding

To complete this example of the tracing process, consider the data sequence shown in column one of Table 2 below. Column 1 shows the signals received, of which the first is S/F (South, Forward). Given the orientation initialization (forward = East), this is equivalent to SE shown in column 2. Further, given an initialization of vehicle position on segment #7, we find, by reference to the Network Table (Table 1), that the vehicle must now have moved to segment #5. This result is shown in column 4, Table 2. Subsequent moves are illustrated in Table 2. In the vehicle movement pattern described, the vehicle moves about (5–6–9–8–10), enters the loop (8–3–2–1), turns and exits (2–7), reenters the loop (2–1) and returns without turning (2–3–8–9).

TABLE 2

| Col. 1—Recorded signal: | Col. 2—Oriented signal | Col. 3—From segment | Col. 4—To final segment |
|---|---|---|---|
| | B = West F = East | Initial Seg. = 7 | |
| S/F | SE | 7 | 5 |
| S/F | SE | 5 | 6 |
| N/B | NW | 6 | 9 |
| S/B | SW | 9 | 8 |
| N/F | NE | 8 | 10 |
| N'B | NW | 10 | 8 |
| N B | NW | 8 | 3 |
| N/B | NW | 3 | 2 |
| N/B | NW | 2 | 1 |
| S/B | B = East / F = West | | |
| | SE | 1 | 2 |
| S/B | SE | 2 | 7 |
| S/F | SW | 7 | 2 |
| S/F | SW | 2 | 1 |
| S/B | SE | 1 | 2 |
| N/B | NE | 2 | 3 |
| N/B | NE | 3 | 8 |
| S/B | SE | 8 | 9 |

The decoding process can be performed manually or by computer. It is discused here to demonstrate the tracing process in which the signals from the physical marker are transformed into route or position information.

Time and sensing data

The decoding results in a description of the movements of the vehicle. Time data may be recorded as well, so that the time and/or duration of the events is also known. The presence of time data, recorded in conjunction with the marker signals sensed would be most valuable to the user. He can then specifically identify where the vehicle time is being spent and establish such performance standards and controls as are appropriate. In a similar manner, it may be desirable to record vehicle operating status (such as zero speed) during the trip in conjunction with the marker signals.

Time pulse generators and clocks are made for use in conjunction with industrial instrument tape recorders by firms such as General American Transportation Corporation. Vehicle sensing devices are also available from commercial manufacturers such as the Barco Division of Aeroquip Corp. or the Vapor Corporation.

DATA SENSING TECHNOLOGY

Several technologies can be used to create the required markers and sensors. The invention pertains to the combination of physical marker/sensors used and the manner in which the marker/sensors are dispersed in the network to achieve the capability of gathering route/position information without uniquely coding each location in the network.

Recording devices

The sensed signals must be recorded for analysis. Of the several devices available, a cartridge loading magnetic tape is most desirable in view of the frequent handling by operating personnel and the need to avoid intricate manual threading and tape damage.

Several firms manufacture recorders suitable to the requirements of this system. Among these firms are Ampex, Concertone, and Genesco Technology.

Alignment of markers in the track

The lateral position of the markers and sensors with respect to the track center line can have a bearing on the coding requirements of the system. Alignment is a form of coding. When alignment is used as a code, the individual markers have fewer codes to convey, thereby reducing system complexity and costs.

For example, a four-code system could utilize one of four possible codes in each marker. If two lateral alignments are used to encode, each marker would have to be equipped with only one of two codes.

Lateral alignment may be used to signify the leg of the switch used. For example, a sensor aligned to the right of the track center may sense only those markers correspondingly placed and signifying the right leg of the switch. The left leg would be detected by a sensor in left of center alignment. The active sensor defines the leg actually used. Only one marker code would be required in a direction coded system—or two in the case of non-direction coded system.

Direction sensing

If direction coding is used, it will reduce the marker code requirement by 50%. To illustrate the equipment avaliable for gathering direction data, the following may be used:

(1) Sensors on the vehicle forward-reverse control system, such sensors currently manufactured and installed on the vehicle by the vehicle manufacturers to control subsystems such as sanders, headlights and other vehicles coupled with multiple unit control cable.

(2) Two or more vehicle carried marker sensors placed in longitudinal series for each lateral alignment. The sequence of sensor activation when passing markers indicates direction. The distance between markers in this technique is always greater than the distance between the sensors.

The use of sensors in longitudinal series to detect direction is to be preferred. It avoids a limitation of vehicle control system sensing, i.e., that the control system and actual vehicle direction are not always in correspondence.

Marker/sensor technology

Many alternatives are available. Among those possible are:

| Marker—Trackside Locations | Sensor—Vehicle Carried |
| --- | --- |
| (1) Static Magnet Fields | Indium antimonide or other magnetic field sensitive crystal capable of generating an electrical pulse. See the article on "The Application of Electronics to Railway Operation" by H. H. Ogilvy, Monthly Bulletin of the International Railway Congress Association, Cybernetics and Electronics of the Railways, English Edition, January 1965, Vol. II No. 1. Publisher IRCA, Brussels. Pages 9–11. |
| (2) Static Magnetic Fields | A coil passing through the marker field generating an electrical pulse as in the intermittent inductive train control system of WABCO and The General Signal Corporation. |
| (3) Component with electronic characteristics. When the marker is near a sensor, the marker's inductance or capacitance becomes an active element in the sensor circuitry. | Code frequency generator and circuitry to detect the "loading" of the circuit and/or the code frequency at which loading occurred such as U.S. Patents 3,189,885 and 2,670,434 assigned to WABCO. |
| (4) Coded laser reflective surfaces | Laser generators and decoding system such as WABCO's ACI system. |
| (5) Coded light reflective surfaces | Light generators and decoding systems such as Sylvania's Kartrack ACI syst m. |
| (6) Microwave reflective coded surfaces | Microwave generators and decoding systems such as shown in U.S. Patent Nos. 3,247,508, 3,247,509, 3,247,510 and 3,247,514. |

An important embodiment of the invention employs the Hall magnetometer technique of sensing. The axes X, Y and Z pass through a semi-conductor crystal at right angles to one another (see FIG. 6). The semi-conductor is passed through a magnetic field whose lines of force are labeled M. The field is shown parallel to axis Y. Current is provided from a power source to pass through the crystal along axis X through connectors GG. The result of these conditions will be the generation of a voltage along the remaining Z axis through connectors HH.

The markers are magnets placed at the exits from route segments such as the two exits at a switch shown in FIGURE 7. They are placed, in this example, a fixed distance L from the track center line. The sensors on the vehicle are given a corresponding alignment. In this example the right hand exit is encoded by placing the marker to the right of the center line. The left exit is encoded by left hand alignment. Lateral alignment coding reduces the remaining coding needs to the determination of vehicle direction. In our example, direction is determined by longitudinally aligning two sensors in each lateral alignment path. The sequence of sensing signifies direction. Four sensors (S1, S2, S3, S4) are used, therefore, as shown in FIGURE 7.

In FIGURE 8 is shown the relationship of these elements. The Hall crystal sensor is supplied with power through connectors GG. As the individual sensor probe passes over the marker magnetic field, a voltage is created in the circuit through connectors HH. This voltage pulse is amplified and sent by cable to the tape recorder where the pulse is encoded.

Each sensor has its own amplifier and output channel to the recorder. Channels 2–4 are similar to channel 1. Time pulses for time reference data are supplied by a crystal oscillator and frequency divider circuit. The time pulses are sent at predetermined intervals, such as 1 minute, into the fifth channel of the recorder.

At the conclusion of the vehicle operation, the tape is placed into a tape reading machine and the pulses transmitted over ordinary telephone lines to a computer center. Standard telephone equipment is used for this purpose. The data is then decoded by computer and the results displayed for the user.

From the foregoing it will be apparent to those versed in the art that I have disclosed a means of inferring the position of a vehicle in the network by relating initial position, coded signal sequence, and the network described.

I claim:
1. A vehicle route tracing system comprising:
 (a) a track network comprising a plurality of adjacent interconnected route segments,
 (b) markers whose position and/or code in said track network encodes each exit from a route segment to each adjacent segment,
 (c) a vehicle located on one of said route segments,
 (d) sensing means on said vehicle to successively sense said markers as said vehicle traverses successive route segments,
 (e) recording means on the vehicle to record the code sequence, whereby knowledge of the route taken by the vehicle may be achieved by interpretation of the coded signal sequence relative to the initial position of the vehicle.

2. The combination set forth in claim 1 wherein every exit from a segment is uniquely coded, and said codes are used repetitively in the network, the number of markers used exceeding the number of codes required to encode the network.

3. The combination set forth in claim 2 wherein certain exits from a route segment are in only one direction from said vehicle, each such exit in one direction being uniquely coded but which code may be used to encode exits in the other direction, sensing means on said vehicle to sense vehicle direction at the moment said marker sensing means is sensing network marker codes.

4. The combination set forth in claim 2, wherein certain exits from a route segment are in only one direction from said vehicle, each such exit in one direction being uniquely coded but which code may be used to encode exits in another direction, and another identical sensing means on the vehicle to also sense route segment markers, said two sensing means being placed in longitudinal alignment on the vehicle, whereby the sequence of sensing by said two sensing means signifies vehicle direction.

5. A vehicle route tracing system comprising:
 (a) a track network comprising a plurality of adjacent interconnected route segments,
 (b) markers whose position and/or code in said track network encodes each exit from a route segment to each adjacent segment,
 (c) a vehicle located on one of said route segments,
 (d) sensing means on said vehicle to successively sense said markers as said vehicle traverses successive route segments,
 (e) transmitting means on the vehicle to send the code data and vehicle identification to a fixed location,
 (f) receiving means at the fixed location to receive and record the code sequence, whereby knowledge of the route and current position of the vehicle may be achieved by interpretation of the coded signal sequence relative to the initial position of the vehicle.

6. The combination set forth in claim 5 wherein every exit from a segment is uniquely coded, and said codes are used repetitively in the network, the number of markers used exceeding the number of codes required to encode the network.

7. The combination set forth in claim 6 wherein certain exits from a route segment are in only one direction from said vehicle, each such exit in one direction being uniquely coded but which code may be used to encode exits in the other direction, sensing means on said vehicle to sense vehicle direction at the moment said marker sensing means is sensing network marker codes.

8. The combination set forth in claim 6 wherein certain exits from a route segment are in only one direction from said vehicle, each such exit in one direction being uniquely coded but which code may be used to encode exits in the other direction, and a second first means on the vehicle to also sense route segment markers, said two first means being placed in longitudinal alignment on the vehicle, whereby the sequence of sensing by said two first means signifies vehicle direction.

References Cited

UNITED STATES PATENTS

| 2,334,507 | 11/1943 | Place | 246—122 |
| 3,128,069 | 4/1964 | Pickell | 246—2 |

DRAYTON E. HOFFMAN, Primary Examiner

U.S. Cl. X.R.

104—26; 246—2